Nov. 13, 1962     H. A. WAGNER     3,064,179
CURRENT RECTIFIER BRIDGE
Filed March 1, 1960
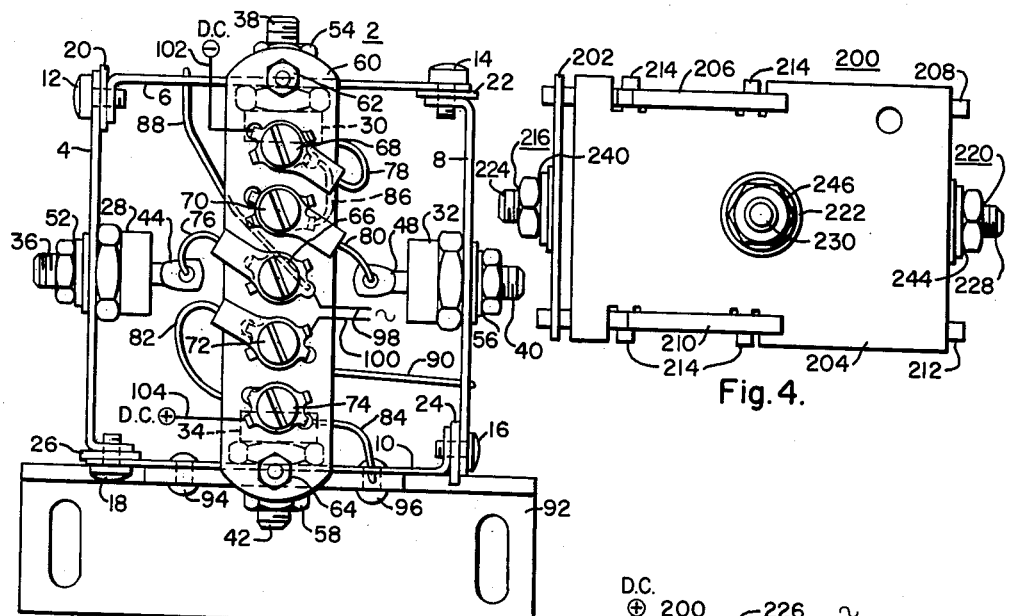
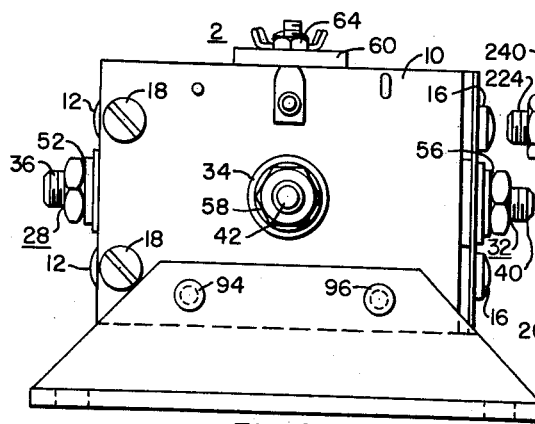
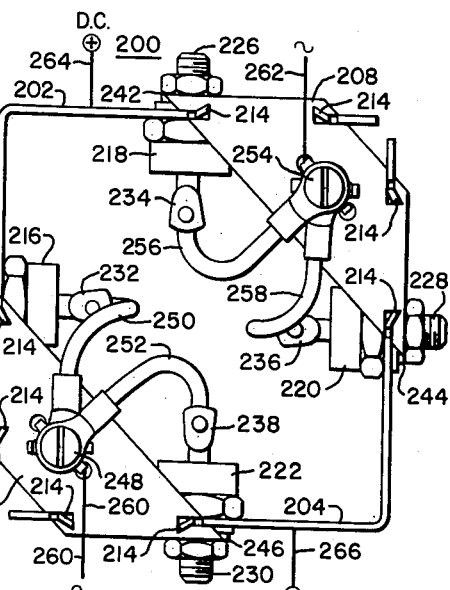
WITNESSES:
Bernard R. Gieguey
Raymond H. Majesko
INVENTOR
Howard A. Wagner
BY
Frederick Shopor
ATTORNEY 3,064,179
CURRENT RECTIFIER BRIDGE
Howard A. Wagner, Churchill Boro, Allegheny County,
Pa., assignor to Westinghouse Electric Corporation,
East Pittsburgh, Pa., a corporation of Pennsylvania
Filed Mar. 1, 1960, Ser. No. 12,080
5 Claims. (Cl. 321—8)

The present invention relates to current rectifying apparatus and more particularly to rectifier bridge assemblies of a kind comprising a plurality of rectifier elements and a plurality of connected supporting plates which carry current and provide heat sinks upon which the rectifier elements are mounted.

In rectifying alternating current, it is a common practice to use individual unitized diodes or rectifier elements which are attached individually to a plurality of separate, parallel heat dissipating plates which in turn are connected together mechanically and electrically to form a compact assembly called a rectifier bridge. There have been problems in securing adequate cooling of the diodes in such bridges. Terminals or leads are provided for a direct current output and alternating current input and usually some mounting means is provided in the way of insulated legs or holes in one or more plates to facilitate mounting the assembly as well as perhaps grounding some terminal or plate.

The individual diodes are usually hermetically sealed in some encapsulation medium, such as metal or glass, to protect the diode surface. Connection to a heat dissipating plate is then usually made by bolting the diode thereto. The prior art rectifier bridge has been usually designed in such a manner so that the diodes are inaccessible when in need of repair or replacement and usually cannot be replaced without dismantling the entire bridge structure or a good part thereof.

It is therefore an object of this invention to provide a rectifier bridge comprising a plurality of supporting plates fabricated into a cylindrical shell having at least two electrically insulated portions and four diode rectifiers mounted on the plates forming the cylindrical shell with each diode being readily accessible and the arrangement enabling cooling of the diodes by natural convection.

Another object is to provide a unitary rectifier fabricated bridge structure of cylindrical or boxlike construction mounting four diodes functioning as a single phase, full wave, non-center tap bridge.

Other objects of the invention will, in part, be obvious and will in part, appear hereinafter.

For a better understanding of the nature and objects of the invention, reference should be had to the following detailed description and drawing in which:

FIGURE 1 is an open end view of the apparatus of the invention.

FIG. 2 is a view in elevation of the apparatus of the invention.

FIG. 3 is an open end view of a modification of the apparatus of the invention, and FIG. 4 is a view in elevation of a modification of the apparatus of the invention.

In accordance with the present invention and in attainment of the foregoing objects there is provided a single phase, full wave, non-center tap rectifier bridge comprising a metallic, open ended cylindrical shell, for example, square, rectangular or like form. The shell comprises at least two plates insulated from each other, the plates being adapted to receive electrical diode components. At least one insulating terminal plate is mounted on and disposed across one end of the cylindrical shell. The terminal plate or plates have a plurality of terminal contacts for attaching input and output leads from the diodes disposed thereon.

Referring now to FIG. 1, there is shown a single phase, full wave, non-center tap rectifier bridge 2 comprising four metallic plates 4, 6, 8 and 10 vertically disposed in a substantially square configuration. The plates may be composed of any good thermal and electrical conducting metal or alloy. Nickel plated copper has been found to be particularly suitable for this purpose. The plates may be easily fabricated by stamping followed by a forming operation since each plate is identical in size and shape. Each plate forming the square configuration is L-shaped, one leg of the L-shaped plate being substantially longer than the other leg. Each short leg is then successively coupled to the long leg of each adjacent plate by means of fasteners 12, 14, 16 and 18. The plates are separated from each other by means of at least one pair of washers 20, 22, 24 and 26. Two of the plates 4 and 10 are coupled by a pair of metallic fasteners 18 and separated by metallic washers 26 whereby they are electrically united. These two plates 4 and 10 could also be made in one piece. The remainder of the plates are joined by pairs of insulated fasteners 12, 14 and 16, nylon screws being found particularly suitable for this purpose, and are separated by insulated washers, such as nylon, 20, 22 and 24 to provide a unitary substantially square configuration. Accordingly, plates 4 and 10 are electrically insulated from plates 6 and 8.

Mounted on the plates 4, 6, 8 and 10 are diode semiconductor rectifier elements 28, 30, 32 and 34. Each rectifier element has a threaded mounting screw 36, 38, 40 and 42, respectively, at one end internally connected to one polarity of the diode and the opposite polarity lead 44, 46, 48 and 50, respectively at the other end. Each diode has a circular shank and the threaded mounting screw passing through a round mounting hole in the plate and secured by a nut and washers 52, 54, 56 and 58, respectively.

A terminal plate 60 comprised, at least in part, of an insulating material, such as glass epoxy or glass polyester laminate, is disposed horizontally across two of the vertical metallic plates 6 and 10 and is secured thereto by the nut and bolt 62 and 64. The terminal plate 60 contains five terminal contacts 66, 68, 70 72, and 74. The terminal contacts 66, 68, 70 and 72 are electrically individually connected to the diodes 28, 30, 32 and 34, respectively by means of electrical conductors 76, 78, 80 and 82, respectively. Terminal contact 74 is electrically connected to the metallic plate 10 by means of an electrical conductor 84. Two of the terminal contacts 68 and 70 are electrically connected to each other by means of a jumper cable 86. Terminal contact 66 is electrically connected to plate 6 by means of electrical conductor 88 and terminal contact 72 is electrically connected to plate 8 by means of an electrical conductor 90. A mounting plate 92 for holding the entire bridge in place, composed of an insulating material, such as paper phenolic laminate, may be then connected to plate 10 by means of mounting studs 94 and 96 as is shown more clearly in FIG. 2 of the drawing.

When the rectifier bridge assembly 2 is put into operation an A.C. current input may be impressed across the terminal contacts 66 and 72 by means of conductors 98 and 100, and direct current output electrical conductors 102 and 104 are connected to terminal contacts 68 and 74.

In another embodiment of the invention there is provided a modification of the heretofore described rectifying bridge assembly. Referring to FIG. 3, there is shown a single phase, full wave, non-center tap rectifier bridge 200 comprising two metallic plates 202 and 204 vertically disposed in a square configuration. The metallic plates may be composed of the same materials as is used in FIG. 1. Each plate is L-shaped with each leg being of substantially the same length. The two plates are insulated from each other by means of four insulating strips 206, 208, 210 and 212 shown in FIGS. 3 and 4. The strips are horizontally disposed across the unjoined corners on each end of the square configuration formed by the two plates 202 and 204.

As will be apparent from the drawing, each strip, for example, 210 is provided with four slits of the thickness of the plates 202, so that it can be slipped vertically into a cut made at each end of the metallic plates. The cut made at each end comprises two metallic projecting tabs 214. The strips, after being inserted into the cut in the plate, are affixed thereto by twisting the metallic tabs 214 projecting from the edges of the metallic plates. Each of two of the strips disposed on one end of the square structure has a terminal contact affixed thereto.

Mounted on the plates 202 and 204 are semiconductor diode rectifier elements 216, 218, 220 and 222. Each diode has a threaded mounting screw 224, 226, 228 and 230, respectively, at one end internally connected to the semiconductor member of the diode and an electrical terminal 232, 234, 236 and 238 at the other end. The circular shank of the diode and the threaded mounting screw pass through a circular mounting hole in the plates and are secured by a nut and washer 240, 242, 244 and 246 respectively. Two of the diodes, 216 and 218, secured to each leg of the L-shaped plate 202 is of a positive base type and the other two diodes, 220 and 222 secured to each leg of the other plate 204 is of a negative base type. Each set of two diodes, one positive base and one negative base type, being electrically insulated from each other by the insulating strip mounted at each corner, is electrically connected through its terminal to one of the terminal contacts mounted on one insulated strip by means of electrical conductors. The diodes 216 and 222 are connected to the terminal contact 248 by means of electrical conductors 250 and 252 and the diodes 218 and 220 are electrically connected to the terminal contact 254 by means of electrical conductors 256 and 258.

In the modification of the apparatus shown in FIGS. 3 and 4 a mounting plate is not needed since the assembly may be mounted by fastening to the insulating strips 210 and 212 as shown in FIG. 4 at the lower end of the substantially square structure. The bridge is secured in place by merely passing a screw through circular holes in each of the insulating plates 210 and 212 and tightening a nut on said screws. When the rectifier bridge is put in operation alternating current input may be impressed across terminals 248 and 254 by means of electrical conductors 260 and 262 and direct current output may be obtained from the metallic plates by attaching electrical conductors 264 and 266 thereto. It may be desired to fasten output terminals to the strips 206 and 208 and connecting the plates thereto.

An important advantage derived from both of the disclosed structures is that the entire single phase, full wave bridge assembly may be inexpensively fabricated. Another advantage is that the bridge structures are compact and easily cooled. The large cylindrical opening enables large volume of cooling air to circulate over the diodes. A third advantage is that the diodes are readily accessible and can easily be replaced when needed with a minimum of disassembly of leads and connections.

It is apparent from the description of the assemblies that the apparatus shown in FIG. 3 employs less electrical parts and is more easily fabricated than the apparatus of FIG. 1.

While only one diode is illustrated as being mounted on each plate or surface, it will be appreciated that two or more diodes may be mounted in parallel on each plate so as to give the desired bridge capacity.

While the present invention has been described with reference to certain preferred embodiments, it will be apparent to those skilled in the art that the practice of this invention may assume other forms and modifications without departing from the spirit and scope thereof.

I claim as my invention:

1. A single phase, full wave, rectifier bridge comprising a metallic, open ended cylindrical shell, the shell comprising at least two plates fastened directly to and insulated from each other, each plate having an electrical diode mounted thereon; one electrical terminal of each diode being electrically connected to its supporting plate, there being four diodes mounted on the plates forming the shell of the bridge, at least one insulating terminal plate connected to the ends of two plates and disposed across one end of said cylindrical shell, the terminal plate having at least one terminal contact disposed thereon, at least one of said terminal contacts being electrically connected to an individual diode, the terminal plate being so dimensioned that the major portion of the end is open whereby flow of cooling air through the open ends is unimpeded so that heat developed in the diodes is conducted to the plate and dissipated to the flowing cooling air.

2. A single phase, full wave rectifier bridge comprising a metallic, open ended cylindrical shell, the shell comprising at least two plates fastened directly to and insulated from each other, means on the plates to receive diodes of one polarity; an insulating terminal plate connected to the ends of two plates and disposed across at least one end of said cylindrical shell, the terminal plate having at least one terminal contact disposed thereon, one terminal contact being electrically connected to each of said diodes, and one of said terminal contacts being electrically connected to said cylindrical shell, the terminal plate being so dimensioned that the major portion of the end is open whereby flow of cooling air through the open ends is unimpeded so that heat developed in the diodes is conducted to the plate and dissipated to the flowing cooling air.

3. A single phase, full wave rectifier bridge comprising four metallic plates vertically disposed in a substantially square configuration, each plate being L-shaped, one leg of the L-shaped plate being substantially longer than the other leg, each short leg being successively coupled to the long leg of each adjacent plate by fastening means, two of the plates being electrically coupled and the remainder being electrically insulated from each other to provide said unitary square configuration; four diodes mounted on the plates, each diode being mounted through a hole in one of the metallic plates with the vertical axis of said diode being perpendicular to the plane of said plate, a substantial portion of each diode being disposed within the space formed by the square structure; one electrical terminal of each diode being electrically connected to its support plate, an insulating terminal plate disposed horizontally on and attached to two of the vertical metallic plates, the terminal plate having five terminal contacts disposed thereon, one each of four of said terminal contacts being electrically connected to individual diodes, and one of said terminal contacts being electrically connected to one of said metallic plates, the terminal plate being so dimensioned that the major portion of the end is open whereby flow of cooling air through the open ends is unimpeded so that heat developed in the diodes is conducted to the plate and dissipated to the flowing cooling air.

4. A single phase, full wave rectifier bridge comprising a metallic, open ended cylindrical shell, the shell comprising at least two plates fastened directly to and insulated from each other, two diodes being mounted on each plate, one electrical terminal of each diode being electrically connected to its support plate, at least two of the diodes being of the positive base type and at least two being of the negative base type; a plurality of insulating strips fastened to the ends of two adjacent plates and disposed across each end of said cylindrical shell to hold the plates in fixed position to each other, two of said insulating strips on one end of said cylindrical shell having a terminal contact disposed thereon, each of said terminal contacts being electrically connected to a positive and negative base type diode, the terminal plate being so dimensioned that the major portion of the end is open whereby flow of cooling air through the open ends is unimpeded so that heat developed in the diodes is conducted to the plate and dissipated to the flowing cooling air.

5. A single phase, full wave rectifier bridge comprising two metallic plates vertically disposed in a substantially square configuration, each plate being L-shaped, each leg of the L-shaped plate being of substantially the same length, the plates being insulated from each other by means of four insulating strips, the strips being horizontally disposed across the unjoined corners on each end of the square configuration formed by the two strips and are affixed thereto by means of metallic tabs projecting from the edges of the metallic plates, each of two of said strips disposed on one end of said square structure having a terminal contact; four diodes mounted on the plates, two of which are of a positive base type and the remainder being of a negative base type, each diode being mounted through a hole in one leg of the rectangular structure formed by the plates with the vertical axis of said diode being perpendicular to the plane of said plate, a substantial portion of each diode being disposed within space formed by the square structure, each set of two diodes, one positive base and one negative base type, being electrically connected to one of said terminal contacts.

References Cited in the file of this patent

UNITED STATES PATENTS

| | | |
|---|---|---|
| 2,485,450 | Kotterman | Oct. 18, 1949 |
| 2,980,828 | Eggers | Apr. 18, 1961 |